May 13, 1952 M. W. MAHNS 2,596,340
DRAWBENCH UNLOADING ARM MECHANISM
Filed June 19, 1947
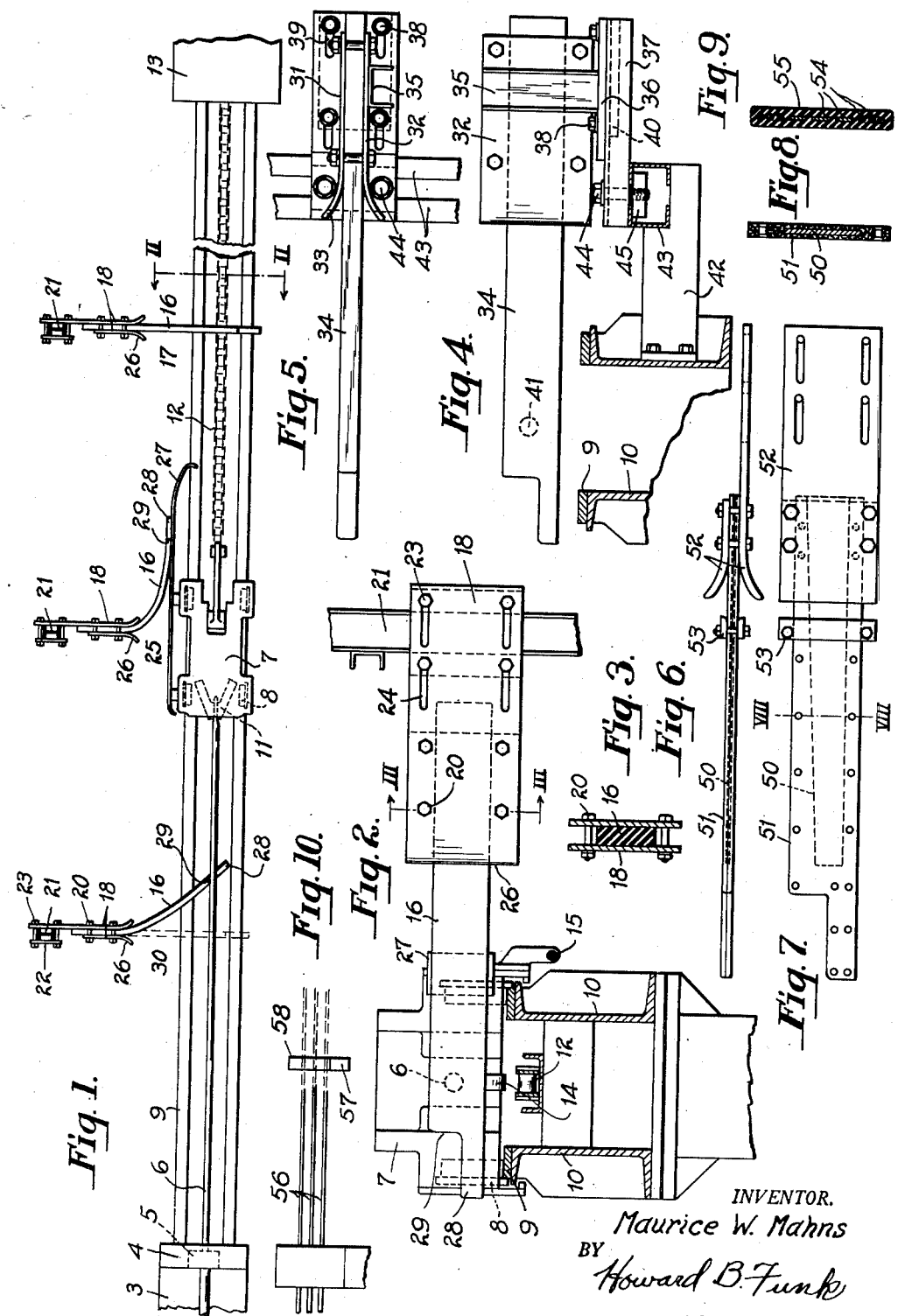
INVENTOR.
Maurice W. Mahns
BY
Howard B. Funk
ATTORNEY Patented May 13, 1952

2,596,340

UNITED STATES PATENT OFFICE 2,596,340

DRAWBENCH UNLOADING ARM MECHANISM

Maurice W. Mahns, La Fayette, Ind., assignor to Aluminum Company of America, Pittsburgh, Pa., a corporation of Pennsylvania Application June 19, 1947, Serial No. 755,619

6 Claims. (Cl. 205—22)

This invention relates to a drawbench unloading apparatus for effecting discharge of tubes, bars, and the like from the drawbench after completion of the drawing operation.

One object of the invention is to provide, in connection with a drawbench, novel and improved means for effecting automatically the discharge of the work from the bench after it has been drawn and wherein no separate power means is required to actuate the same.

Another object is to provide drawbench unloading arms so constructed and arranged that the drawn work is ejected from the drawbench by a positive ejecting action effective the instant the work leaves the die.

A further object is to provide discharge arms for a drawbench which are resiliently engageable with the work being drawn and held thereby under work-expelling tension sufficient to eject the work laterally from the bench as soon as the draw is completed.

Still further objects are to provide discharge mechanism that is adapted to discharge single or plural pieces of work quickly and positively and without intervention by the operator, to provide a simple, inexpensive and effective discharge mechanism, to provide discharge arms of resilient construction in which the resilience of the arms in flexure is employed to cause ejectment of the work, and to provide work ejecting mechanism operable without damaging the work or marking or scratching the surface thereof.

The foregoing and other advantages and objects of the invention will appear from the following detailed description taken in conjunction with the accompanying drawing in which Fig. 1 is a diagrammatic fragmentary plan view of a drawbench provided with the discharge arm mechanism of the present invention and showing the draw head or tongs carriage at an intermediate position in its travel away from the die; Fig. 2 is a cross sectional view on an enlarged scale taken on the line II—II of Fig. 1; Fig. 3 is a view taken on the line III—III of Fig. 2; Fig. 4 is a view similar to Fig. 2, but showing a modification; Fig. 5 is a plan view of the structure of Fig. 4; Figs. 6 and 7 are views in plan and side elevation of a modified form of discharge arm; Fig. 8 is a view taken on the line VIII—VIII of Fig. 7; Fig. 9 is a view similar to Fig. 8 showing a modified construction, and Fig. 10 is a fragmentary side elevational view diagrammatically illustrating on an enlarged scale, the application of the invention to a drawbench arranged for multiple work piece drawing.

Drawbenches of the type herein illustrated are well-known in the art and usually comprise a mandrel section (not shown), a die section and a draw section in longitudinal alignment, the former and the latter each being long enough to accommodate the desired lengths of work to be operated upon. In Fig. 1, the die section 3 comprises a die holder 4 in which is removably mounted a die 5 through which the workpiece 6, here illustrated as a tube, may be drawn to reduce it to the desired cross sectional shape and dimensions. This die section may be of any well-known construction.

The draw section includes a draw head or carriage 7 provided with flanged wheels 8 for travel along track bars or rails 9 that are secured to the upper flanges of laterally spaced channels 10 (Fig. 2) forming the frame or bed proper of the drawbench. The carriage is provided with suitable jaws or grips 11 with which to grip the end of the tube projecting through the die. It will be understood, of course, that the tube will be provided with a reduced or pointed end so that such end may be projected through the die for gripping by the jaws.

Arranged centrally between the channels 10 is the usual draw chain 12 that is continuously driven by suitable motor drive located at 13. A pivoted hook 14 on the carriage is adapted to be moved down from a normally raised position into hooked engagement with the chain whereby the carriage with its jaws 11 closed upon the end of tube 6 will be moved away from the die to draw the tube 6 through the die 5. Afterwards, the carriage will be returned to the die by means of a return cable connected to the carriage at 15 (Fig. 2) and controlled by the operator as is well understood in the art.

The drawbench as thus far described is conventional and well known in the art and forms no part of the present invention, per se, and consequently need not be illustrated and described in greater detail.

In order to enable the carriage to be returned to the die after a tube has been drawn, it is first necessary, of course, to remove the drawn tube from the drawbench. In accordance with the present invention, discharge arms of strap-like form are provided to effect removal of the work from the drawbench by a positive ejecting action. In Figs. 1, 2, and 3, the ejector arms are indicated at 16.

The arms 16 are disposed at longitudinally spaced intervals along the draw section of the drawbench, intervals of between 5 and 6 feet having been found suitable. They are disposed in overlying relation to the track 9 and extend transversely entirely across the drawbench, normally occupying the position illustrated at 17 (Fig. 1) at right angles or normal to the draw axis. In a vertical plane, the arms are disposed in a position intersecting the draw axis, as will be seen from inspection of Fig. 2. At one side of the bench, here referred to as the back side, each of the arms is clamped between clamping plates 18 held together by suitable means such as bolts 20, one of the plates extending rearwardly and being in turn secured or anchored to an upright or post 21 by suitable means including plate 22 and bolts 23 straddling the post. By loosening the nuts on the bolts 23, the clamping plates 18 and their arms are freed for vertical adjustment relatively to the draw axis. Also, the arms 16 may be shifted horizontally to vary the extent of projection of their free ends past the draw axis either by extending or retracting the arms with respect to the clamp plates 18 or by loosening bolts 23 and shifting the clamp plates and their arms bodily with respect to the posts 21, horizontally elongated slots 24 through which the bolts 23 extend being provided to permit such adjustment. The utility of this adjustment will be hereinafter pointed out. It may be here mentioned that in many instances an elevated storage rack or platform (not shown) on which a load of pointed tubes to be drawn are kept is provided at the back side of the drawbench and includes vertical supporting posts at regular intervals that may be used for attachment of the arms in operating position with respect to the drawbench.

The arms 16 are made from resilient material so that they will deflect or bend back out of the way to permit the carriage to pass, as illustrated at 25 in Fig. 1, and will spring back toward normal position after the carriage has moved past them. At the same time, since the arms are adapted to engage the tubes being drawn by reason of their positioning in intersecting relation to the tube axis as above described, it is desirable that the material of the arms be such that marking or scratching of the surfaces of the work will be avoided. Rubber compounds either natural or synthetic are suitable and the arms may be composed wholly of rubber or have imbedded therein reinforcing material such as woven fabric and the like. When a substantially all rubber composition is used, with or without fabric reinforcement, it should exhibit a durometer reading of between 60 to 70 or the equivalent in order to withstand repeated flexing in opposite directions as the carriage moves back and forth along the track and to impose sufficient flexure tension on the tube being drawn to cause ejectment thereof when the arms spring back to normal position. To eliminate danger of cutting the arms at their points of bending, the plates 18 are formed with curved, vertical edges forming a bending throat for the arms as indicated at 26.

As will be seen in Fig. 1 as the carriage 7 is being moved away from the die, the arms will be engaged in succession by the forward end of a projecting guide member 27 secured to the back side of the carriage. Since the draw chain 12 rises somewhat under drawing tension, the guide 27 serves to deflect or push each arm back as the carriage approaches it to an extent sufficient to avoid contact between the underside of the arm and the raised chain. The extent that the chain rises, of course, is dependent upon the draw tension and under light load conditions or draws it may not be necessary to use an extended guide. However, in most cases it is desirable to provide a guide so that there will be a smooth and plain surface at the one side of the carriage with which the arms may engage as the carriage passes to avoid possibility of damage to the arms by irregularities in contours usually present on drawing head carriages with which the arms would otherwise engage.

As seen more clearly in Figs. 2 and 3, the slat-like arms 16 are substantially rectangular in cross section and are disposed with their wide side vertical. The vertical dimension of each arm is much greater than its thickness whereby the arm is substantially rigid in a vertical plane and flexible in a horizontal plane. The free end of each arm is formed with a substantially right angle notch to provide an outstanding tongue 28 which serves as a work supporting seat and a vertical work engaging shoulder 29 set back from the extremity of the arm. By the vertical adjustment of the arms heretofore described, they will be set so that the tongue 28 will underlie the tube being drawn and the shoulder 29 will overlap the vertical dimension of the tube. Hence, when the carriage 7 has passed an arm, it springs back toward normal position, but its shoulder 29 engages the tube before the arm reaches normal position so that it is stopped in substantially the partially flexed position shown at 30 in Fig. 1. The successive arms thus actuated into engagement with the tube are held in partially flexed or tensioned condition effective to cause ejectment of the work or tube 6 from the drawbench when the draw is completed. The bending radius of the arms as well as the degree of expelling tension exerted by the arms on the work may be adjusted or controlled by the aforementioned horizontal adjustment of the arms. This adjustment causes the arms to assume a greater or lesser partially flexed condition when bearing upon the tube prior to ejectment thereof.

From the foregoing description, it is thought that the operation will be apparent. Briefly, as the carriage moves toward the right (Fig. 1), drawing the tube through the die, the guide member engages each of the arms in turn and pushes it back to allow the carriage to pass. After passing, the arm snaps back towards its normal position and in so doing engages the tube which holds the arm in partially flexed condition. Thereby at intervals along its length the tube 6 will be subjected to static ejectment force. As soon as the tube leaves the die, drawing tension disappears, the jaws 11 automatically open and the carriage pulls away from the end of the tube. The resilient arms then straighten out and impart lateral discharge thrust to the tube, the underlying tongue 28 of the arms affording support to the tube during the ejecting operation thus preventing the tube from dropping on to the draw chain or other portion of the drawbench. In observed operation, the die end of the tube moves laterally before the carriage end of the tube does, since the carriage needs to move beyond the end of the tube to free it so that during discharge, the tube cants sidewise somewhat, but this canting is not found to be objectionable. The ejector arms by their resilience thus automatically eject the successive tubes from the drawbench on to a suitable collecting rack or skids located adjacent to the drawbench (not shown) but customary and well known in the art.

In Figs. 4 and 5 there is illustrated a form of support for the arms which includes vertical clamping plates 31 and 32 each outwardly flared as indicated at 33 and clamping a resilient arm 34 between them. Plate 32 is welded or otherwise secured to an upright 35 whose base 36 is supported on a supporting member 37 parallel with the arm 34 by means of bolts 38 passing through elongated slots 39 in the base and threadedly received in a plate 40 carried by the member 37. The arm 34 and its clamp may be bodily adjusted on the supporting member to adjust the projection of the arm relative to the tube axis indicated at 41 for the purpose above described. Secured to one of the channels 10 of the bench frame at suitable intervals are brackets 42 supporting a pair of spaced channel members 43 in face-to-face relation paralleling the draw axis 41. The supporting member 37 is attached to the channels 43 by means of bolts 44 that extend down through the gap between the channels and are threaded into a nut plate 45 located below the flanges of the channels 43. The channels are continuous along a desired length of the drawbench. This construction enables as many ejector arms to be conveniently disposed along the bench at regular or irregular intervals as desired to effect ejectment of work of various sizes and weights.

The structure shown in Figs. 6, 7 and 8 comprises a resilient arm consisting of a suitable thin gauge spring steel blade 50 encased in a cover or boot 51 of pliable material, the spring blade 50 affording the requisite resilience in a horizontal plane and stiffness in a vertical plane while the cover 51 provides the needed protection against marking of the work. This cover 51 may be of rubber or the like bonded to the steel by known processes or as here shown may be made from thin strips of rubberized belting or other non-abrading material disposed on either side of the blade and held together by suitable means such as soft metal rivets as indicated. The composite arm is adapted to be clamped in operating position by clamping plates 52 corresponding to the plates 18 in the same way as heretofore described. Its free end is notched, as shown, to provide seat and shoulder elements corresponding to elements 28 and 29. A pressure clamp 53 consisting of narrow plates disposed at opposite sides of the arm may be provided to clamp the cover strip to the blade 50 at a point near the bending axis of the arm to relieve the rivets from the bending pressure. The outer end of the blade 50 is terminated short of the notched portion of the cover 51 as shown.

In Fig. 9 there is shown a composite resilient arm construction which conforms in exterior configuration to that of Fig. 7 and comprises core strands 54 of spring metal imbedded in and bonded to an integral covering of suitable elastic or pliable material such as relatively soft rubber or the like. The strands 54 may consist of wires or ribbons of spring steel disposed in side by side relation and extend lengthwise of the composite arm. The lowermost strands may extend into and form reinforcement for the tongue portion of the arm. By this construction, the requisite characteristics of vertical stiffness, horizontal resilience and non-abrasion may be easily attained and such arms produced readily capable of handling of various sizes and weights of work pieces.

In Fig. 10, the drawbench is shown equipped with a die adapted for simultaneous drawing of a plurality of work pieces or tubes 56 arranged in vertical alignment in the present illustration, the invention being of exceptional value in connection with such multiple tube drawing. Ordinarily where a drawbench is of a given capacity for drawing a single tube and is used for multiple tube drawing, the drawn tubes are of such small diameter and flexibility that they are not easily discharged from the drawbench. Usually, manual removal requiring the service of a helper for the bench operator has been necessary. Moreover aggravating the discharge problem is the fact that the tubes being drawn because of length variations do not all leave the die at the same instant. With the present invention, however, each tube as it leaves the die is supported on the tongue portions 57 of the flexed arms 58, until the last tube to leave the die does so at which instant the flexed arms straighten and eject the group of tubes en masse out of the drawbench as heretofore described for a single tube without the necessity of the operator handling the tubes after the draw has once been started.

From the foregoing it will be seen that there is provided an automatic drawbench discharge structure of extremely simplified and effective form. It is to be understood, of course, that other changes and modifications than those herein specifically described may be made without departing from the spirit of the invention or the scope of the appended claims.

What is claimed is:

1. In a drawbench, an unloading mechanism comprising elongated unloading arms of wide thin strap-like form, supporting means for said arms including clamps to which said arms are adjustably secured at one end, said supporting means being disposed laterally of the draw bench at spaced intervals therealong and supporting said arms in a position wherein they extend substantially transversely and horizontally across said draw bench to substantially the opposite side thereof in intersecting relation to the draw axis, each of said arms being made from resilient material and being held wide side vertical for flexing laterally of said vertical wide side into engagement at their free ends with the work being drawn and in partially flexed condition impose lateral ejecting force thereon effective to eject the work from said opposite side of the drawbench when drawing thereof is completed, said resilient material being rubber exhibiting a durometer hardness of between 60 and 70.

2. A drawbench unloading mechanism comprising unloading arms of resilient material and of wide thin strap-like form, clamping means disposed outwardly of one side of the drawbench at spaced intervals therealong for individually clamping said arms at one end wide side vertical, said arms extending lengthwise substantially horizontally across the drawbench to a point adjacent to the opposite side thereof at a level intersecting the draw axis, whereby movement of the draw carriage of said drawbench flexes successive arms in passing and they resiliently engage at their free ends the work being drawn and exert static ejectment force thereon effective to discharge the work from said opposite side of the drawbench when drawing thereof is completed.

3. An apparatus according to claim 2 wherein said clamping means includes clamping plates disposed vertically for clamping an arm between them, the vertical edges of said plates being curved outwardly and forming a bending throat for said arm.

4. Work supporting and ejecting mechanism for a drawbench, comprising resilient ejector arms of wide thin strap-like form, supporting means disposed at one side of the bench at spaced intervals therealong for individually supporting said arms at one end, each of said supporting means including a pair of vertical clamping plates between which the arm is clamped wide side vertical, said arms extending substantially horizontally across the bench to a point adjacent the opposite side of the bench at a level intersecting the axis of the work being drawn, whereby movement of the draw carriage in said drawbench flexes the successive arms in passing and each arm springs back into resilient contact with the work being drawn and imposes lateral ejecting force thereon after the carriage passes, the free end of each arm being notched to form a work supporting tongue and a work engaging shoulder, each of said arms including a core of spring metal extending lengthwise of the arm, and a covering of pliable material encasing said core.

5. A mechanism according to claim 4 further characterized by said spring metal core being comprised of a multiplicity of elongate wire-like strands in side by side relation imbedded in said pliable covering and integrally bonded thereto.

6. A drawbench unloading mechanism comprising unloading arms of resilient material and of wide thin strap-like form, clamping means disposed outwardly of one side of the drawbench at spaced intervals therealong for individually clamping said arms at one end wide side vertical, said arms extending lengthwise substantially horizontally across the drawbench to a point adjacent to the opposite side thereof at a level intersecting the draw axis, whereby movement of the draw carriage of said drawbench flexes successive arms in passing and they resiliently engage at their free ends the work being drawn and exert static ejectment force thereon effective to discharge the work from said opposite side of the drawbench when drawing thereof is completed and a tongue member on the free end of each of said arms in position to underlie said work and support the same during discharge.

MAURICE W. MAHNS.

REFERENCES CITED

The following references are of record in the file of this patent:

UNITED STATES PATENTS

| Number | Name | Date |
|---|---|---|
| 1,541,118 | Cole | June 9, 1925 |
| 1,855,051 | Iuscho | Apr. 9, 1932 |
| 1,889,039 | Quinn | Nov. 29, 1932 |
| 1,940,354 | Kerr | Dec. 19, 1933 |
| 2,182,902 | Nye | Dec. 12, 1939 |
| 2,262,432 | Rodder | Nov. 11, 1941 |
| 2,301,674 | Andrews | Nov. 10, 1942 |
| 2,367,793 | McIlvried | Jan. 23, 1945 |
| 2,369,467 | Kerr | Feb. 13, 1945 |
| 2,446,438 | Strock | Aug. 3, 1948 |

FOREIGN PATENTS

| Number | Country | Date |
|---|---|---|
| 451,481 | Great Britain | Aug. 6, 1936 |